United States Patent
Hans (10) Patent No.: US 6,992,418 B2
(45) Date of Patent: Jan. 31, 2006

(54) STATOR COMPONENT FOR AN INNER ROTOR DC MOTOR

(75) Inventor: Helmut Hans, Sankt Georgen (DE)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/671,944

(22) Filed: Sep. 29, 2003

(65) Prior Publication Data

US 2004/0124732 A1    Jul. 1, 2004

(30) Foreign Application Priority Data

Nov. 11, 2002  (DE) ................................. 102 52 316

(51) Int. Cl.
*H02K 1/16* (2006.01)
*H02K 3/00* (2006.01)
*H02K 1/12* (2006.01)

(52) U.S. Cl. ...................................... 310/216; 310/217

(58) Field of Classification Search ........ 310/216–218, 310/179–180, 184, 185, 254, 258, 259

See application file for complete search history.

(56) References Cited

U.S. PATENT DOCUMENTS

| | | | | |
|---|---|---|---|---|
| 3,983,435 A | * | 9/1976 | Sims | 310/259 |
| 4,315,171 A | * | 2/1982 | Schaeffer | 310/49 R |
| 5,729,072 A | * | 3/1998 | Hirano et al. | 310/258 |
| 5,804,896 A | * | 9/1998 | Takehara et al. | 310/67 R |
| 6,140,728 A | * | 10/2000 | Tomita et al. | 310/156.12 |
| 6,166,471 A | * | 12/2000 | Kometani et al. | 310/198 |

FOREIGN PATENT DOCUMENTS

| | | |
|---|---|---|
| EP | 1020975 | 7/2000 |
| GB | 1212451 | 11/1970 |
| JP | 601872247 | 9/1985 |
| WO | WO02058210 | 7/2002 |

* cited by examiner

Primary Examiner—Tran Nguyen
(74) Attorney, Agent, or Firm—Duane Morris LLP (57) ABSTRACT

Stator component for an inner rotor motor which has a ring-shaped stator coil flux guide and a number of pole shoes extending inwardly from the central, inner opening of the stator coil flux guide, the stator component being divided into several stator sections, each stator section consisting of all the pole shoes of one phase.

16 Claims, 9 Drawing Sheets

STATOR COMPONENT FOR AN INNER ROTOR DC MOTOR

This application claim priority to the filing date of German Patent Application No. DE 102 52 316.9, filed Nov. 11, 2002, the disclosure of which is incorporated herein in its entirety.

FIELD OF THE INVENTION

The invention relates to a stator component for an inner rotor DC motor which has a ring-shaped stator coil flux guide (yoke) and several pole shoes. The pole shoes extend inwardly from the central, inner opening of the stator coil flux guide in a radial direction.

BACKGROUND OF THE INVENTION

The invention is generally related to inner rotor DC motors, particularly electronically-commutated, brushless direct current (DC) motors. Motors of this kind can be used in a variety of applications, examples being in automotive engineering for fans, cooling pumps or steering system support. Other application areas include ventilator fans in power supply units, or spindle motors in disk drives for data processing systems, just to mention a few.

A brushless DC motor basically consists of a shaft, a rotor assembly equipped with one or more permanent magnets arranged on the shaft, and a stator assembly which incorporates a stator component (e.g. made of sheet metal) and phase windings. Two bearings are mounted at an axial distance to each other on the shaft to support the rotor assembly and stator assembly relative to each other.

Figure 1:
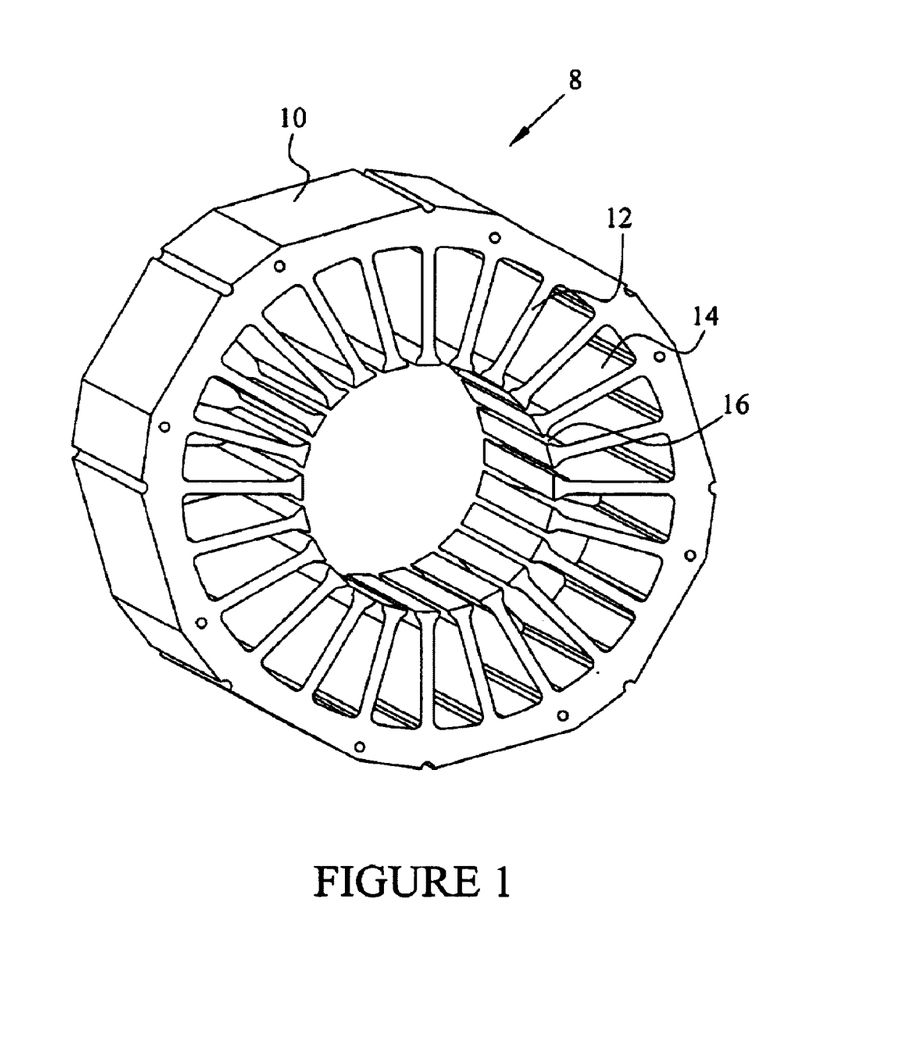
FIG. 1 shows a schematic perspective view of a stator component.

An example of a stator component which can be utilized in the stator assembly is illustrated in FIG. 1. The stator component 8 consists of a ring-shaped stator coil flux guide 10 and several pole shoes 12 which extend inwardly from the central, inner opening of the stator coil flux guide 10 in a radial direction. Stator slots 14 are formed between the pole shoes 12.

The stator component illustrated in the example in FIG. 1 has 27 pole shoes 12. Nine pole shoes 12 are available for each phase winding, as it is assumed that the stator component 8 is intended for a three-phase DC motor. A conflict arises in relation to the winding of the stator component 8 with three phase windings, as there must be sufficient space for applying the windings between the pole shoes 12, and a narrow opening 16 of the slot 14 is advantageous for the electromagnetic configuration of the stator. This conflict can be clearly seen in FIG. 1. It is increased by the fact that the space available for the winding between two pole shoes 12 actually is reduced by a tapered area which is required for inserting the winding wire between each two pole shoes 12.

The document DE 101 06 717 A1 describes an element for an electrical motor which can be used as a stator or rotor and consists of two supporting components which, when combined in an axial direction, form the element itself. Each of the supporting components has pole teeth, although directly adjacent pole teeth in the circumferential direction are not formed by the same supporting component to enable making of the distance between the adjacent teeth of the same supporting component large enough to considerably facilitate the winding procedure or the fitting of a coil.

Therefore it is the object of the invention to specify a stator component for an inner rotor motor which has a narrow slot opening to ensure good motor function, but simultaneously can be easily and efficiently wound.

SUMMARY OF THE INVENTION

This task has been solved with a stator component according to claim 1. The invention, more particularly, provides for dividing the stator component into several stator sections, with a stator section encompassing the pole shoes of a phase in each case. The basic intention behind the invention is to divide the stator in different levels, with stator sections being joined in a manner which results in them forming together a complete stator component.

A variety of advantages are achieved, due to the fact that each stator section encompasses all the pole shoes of a phase. Production is simplified, as each phase can be completely wired and interleaved in its stator section. Only the individual phase windings need be connected (e.g. delta or Y connection) after the individual stator sections are fitted. Advantages are also attained with regard to motor operation, as the embodiment of the present invention ensures that it is not influenced by magnetic stray flux from other adjacent phases, and the same electromagnetic properties apply to each phase, as the same electromagnetic resistances are generated for each phase.

Each stator section consists in particular of part of the ring-shaped stator coil flux guide which is especially designed to only extend over part of the axial length of the stator component. Moreover, the stator component encompasses the pole shoes belonging to a phase, these basically extending along the entire axial length of the stator component. The ring-shaped coil flux guide extends in particular over a fragment of the axial length of the stator component corresponding to the number of phases. The axial length of the ring-shaped coil flux guide is preferably equivalent to one third of the overall length of the stator component in the case of a three-phase motor.

The stator component according to the invention can, in particular, be manufactured so that each stator section consists of two bonded parts. One component consists of an enclosed ring and the pole shoes belonging to a phase, these each extending over a fragment of the axial length of the stator component previously mentioned, and the other component consists of the missing part of pole shoes belonging to this phase, thus complementing the first component, so that the each of the pole shoes belonging to the respective phase extends along the entire length of the stator component. Both components can, for example, be united through stamping and packaging or adhesive bonding.

According to the present invention, the stator sections for the three phases are produced separately, and the pole shoes of the respective stator section for each phase are wired before the individual stator sections utilized for forming the completed, wired stator are bonded together. Adequate space is available for winding the pole shoes, as pole shoes for the respective other phases are missing on the stator sections. Phase windings can still be shaped before the bonding of stator sections through the application of pressure. The individual stator sections are subsequently connected, being interleaved until they form a completely wired (wound) stator.

The invention also relates to a method for manufacturing a stator component in accordance with claim 11. Preferred embodiments of the invention are indicated in the dependent claims.

BRIEF DESCRIPTION OF THE INVENTION

The invention is explained in greater detail below on the basis of a preferred embodiment and with reference to the drawings.

DETAILED DESCRIPTION OF PREFERRED EMBODIMENTS

FIG. 1, which has already been described, shows a perspective view of a stator component 8 for use in an electrical motor, particularly an electronically-commutated direct current (DC) motor. The stator component 8 consists of a ring-shaped coil flux guide or yoke 10 and pole shoes 12, between which stator slots 14 are formed. A slot opening is designated as 16. An one of ordinary skill in the art will understand that the invention can be utilized on stator components with arbitrary number of poles/slots.

Figure 2:
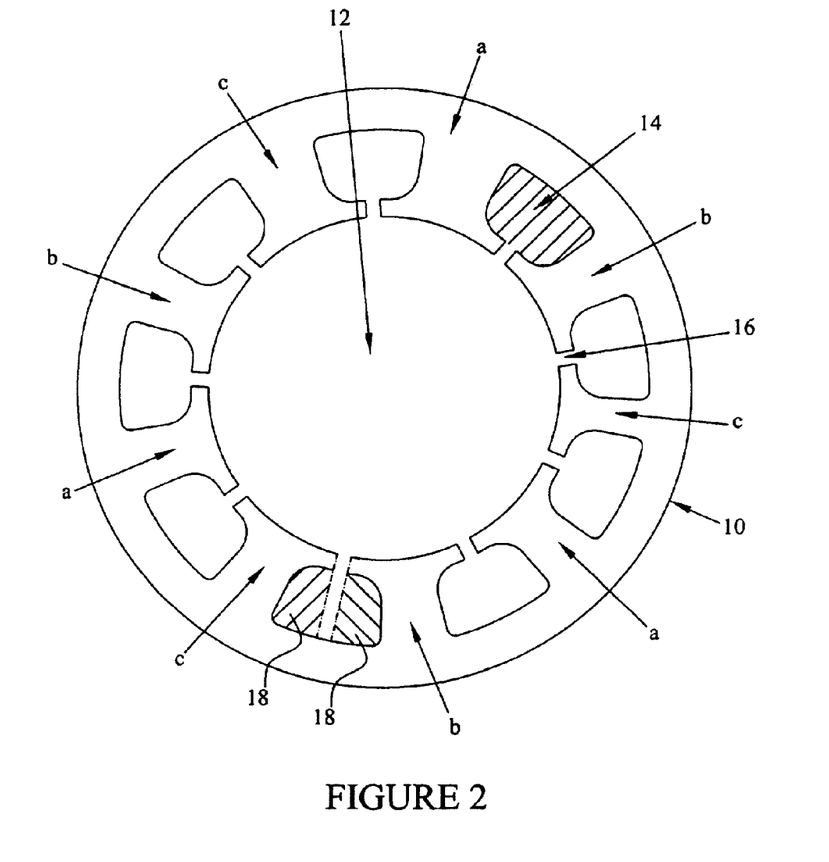
FIG. 2 shows a schematic top view of the stator component stamped sheet with nine pole shoes.

FIG. 2 illustrates a schematic top view of a stator component. This top view is equivalent to the so-called stamped sheet for a stator component produced from several metal sheets. A ring-shaped coil flux guide 10 and pole shoe 12 are shown in the stamped sheet illustrated in FIG. 2. A stator slot 14 is illustrated between every two pole shoes 12, the slot opening being designated 16. The stator slot 14 creates the space available for the phase winding, this also being termed the winding space.

The stamped sheet illustrated in FIG. 2 has nine stator slots 14 and nine pole shoes 12 and is intended for a three-phase brushless direct current (DC) motor. The pole shoes a support the winding for phase 1 here, the pole shoes b support the winding for phase 2, and pole shoes c support the winding for phase 3.

In a conventional stator component, the slot opening 16 must be large enough to pass a winding wire through it during winding. Furthermore, the winding space in the area of stator slot 14 is limited, because adequate space must be available for fitting the winding wire as far as the bottom of the pole shoe. The actual space available for the phase winding is schematically indicated in FIG. 2 at 18, 18' by a hatched line. These pole shoe 12, stator slot 14 and slot opening 16 dimensions should therefore be selected so that space is available for introducing a winding wire (not illustrated) into the stator slot 14 for winding the pole shoes 12. A narrow slot opening 16, on the other hand, is advantageous for electromagnetic configuration of the motor and, in particular, generating a torque with low torque ripple.

Figure 3:
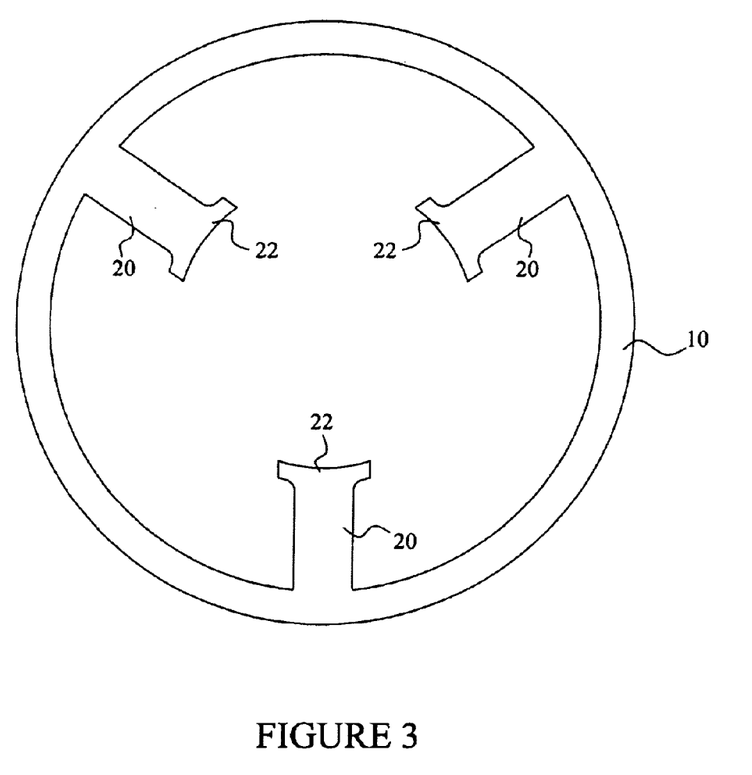
FIG. 3 shows a schematic top view of the same stator component stamped sheet as in FIG. 2, but only the poles of a single phase are illustrated.

FIG. 3 illustrates (in reduced scale) the stamped sheet of a similar stator component with nine slots, but, according to the invention, only the pole shoes 20 are provided which carry by the windings of the same phase. The pole shoes 20 are provided on the inner central opening of the ring-shaped stator coil flux guide 10, as is the case with the stamped sheet in FIG. 2. According to the invention, the stator component consists of three stator sections, whose top view (or stamped sheet) is formed as shown in FIG. 3. It is apparent from FIG. 3 that the pole shoes 20 of the stator section shown can be wired by the winding wire for one of the electrical motor phases without any difficulty. There are obviously no restrictions caused by a small slot opening or the tapered space required for fitting the winding wire. Of particular importance is that every hammer or tooth 22 of the pole shoe 20 can made broader, in contrast to the prior art stator component, as no minimum dimension is specified for the slot opening 16 (See FIG. 2).

According to the invention, three stator sections (or two in the case of a two-phase motor) are manufactured separately and wired before these are joined to form a single stator component. The top view, or stamped sheet, of the three (or two) stator sections is identical. A second and third stator section would support the second or third phase winding and be arranged offset to the first stator section as illustrated in FIG. 3. Each of the stator sections is arranged offset at 360°:N to each other (depending on the number of phases N). The embodiment illustrated has an angle offset of 360°:9=40°.

Pressure can be optionally applied to the windings (not illustrated in FIG. 3) from the pole shoe 20 side to shape the windings if required after winding of the individual pole shoes (e.g. 20 in FIG. 3). The teeth or hammers 22 of the pole shoes can be made wider than in the prior art, as each stator section only consists of the pole shoes and windings of a single phase. The width of each hammer 22 is only limited by the next adjacent hammer (i.e. the hammer belonging to the adjacent phase). The slot opening of the completed stator component can be minimized as a result, meaning the stator component as a whole conveys a greater flux and generates a lower torque ripple.

The assembled stator component is manufactured in accordance with the invention by interleaving three wired stator sections together. This is explained in greater detail with reference to FIGS. 4 to 6. The preferred embodiment of the invention is explained on the basis of a three-phase DC motor, although an expert will understand that the invention is not limited to this.

Figure 4:
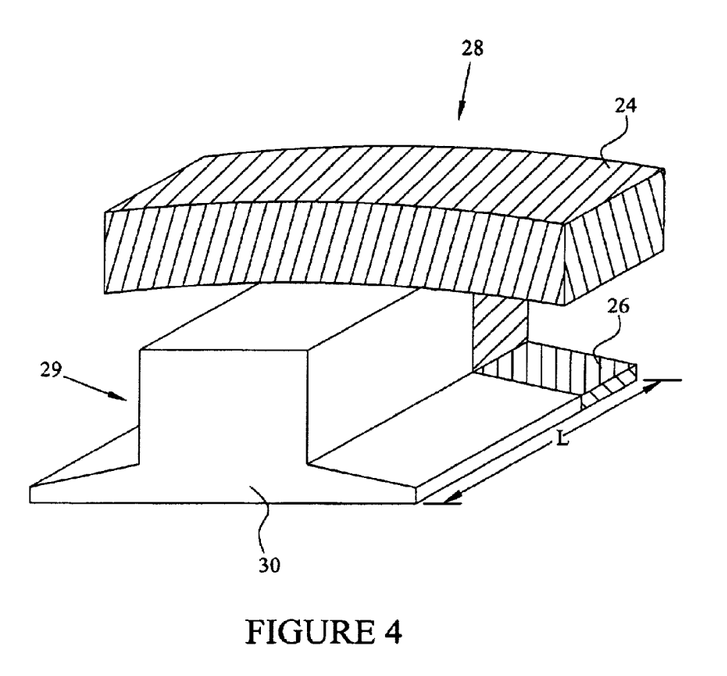
FIG. 4 shows a schematic perspective view of part of a first stator section of the stator component according to the invention.

The first stator section 28 illustrated in FIG. 4 consists of a first ring-shaped stator coil flux guide or yoke component 24 and the pole shoes 29 belonging to one phase.

The stator section 28 is assembled from several parts, namely an enclosed ring-shaped component (illustrated with a hatched line in FIG. 4) and part 24 of the ring-shaped stator coil flux guide, along with part 26, which encompasses the pole shoes 29 belonging to that phase. Part 24 of the ring-shaped stator coil flux guide and part 26 of the pole shoes (FIG. 4 only illustrates one of the pole shoes of a phase) each extend over a third (1:number of phases) of the axial length L of the stator component. The second part of the stator section 28 for this phase is formed by the respective missing parts 30 of the pole shoes 29 belonging to this phase. These pole shoe components 30 supplement the pole shoe components 26 to form in total the pole shoes 29 of one phase (e.g. phase 1) which extends the full axial length L of the stator component. The axial length of the pole shoe components 30 forms two thirds of the axial length L in the illustrated embodiment, more generally (number of phases-1):(number of phases)·stator length L. Parts 24, 26 and 30 of the stator section 28 are joined (e.g. through packaging or adhesive bonding) before winding the stator section 28.

The illustration in FIG. 4 shows only part of the ring-shaped stator coil flux guide 24 and a pole shoe 29 for reasons of simplicity. An one of ordinary skill of the art will understand that the top view of the stator section 24 illustrated in FIG. 4 is equivalent to the view in FIG. 3 and encompasses an enclosed ring-shaped stator coil flux guide 24 and all pole shoes of one phase.

Figure 5:
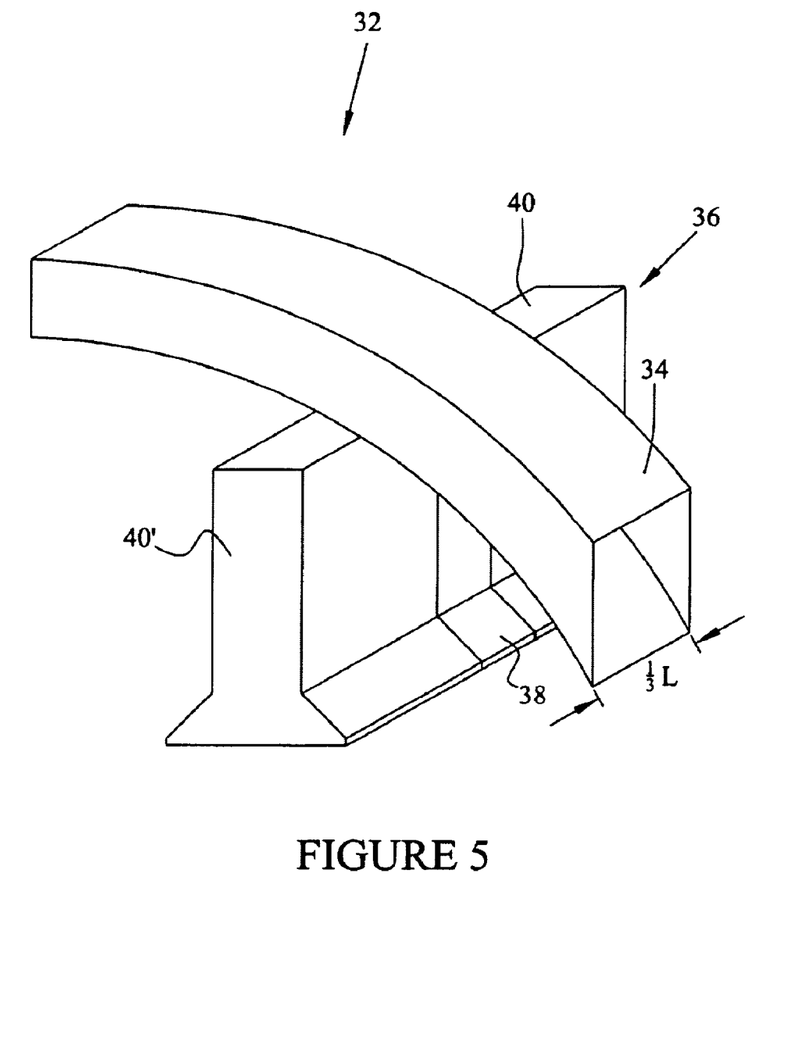
FIG. 5 shows a schematic perspective view of part of a second stator section of the stator component according to the invention.

FIG. 5 schematically illustrates part of a second stator section 32, for example the stator section for phase 2. This includes a further part 34 of the ring-shaped stator coil flux guide and the pole shoes 36 assigned to phase 2, although only one pole shoe 36 is illustrated in FIG. 5. The stator section 32 illustrated in FIG. 5 consists of three assembled parts, namely part 34 of the ring-shaped stator coil flux guide and an associated part 38 of the pole shoes of phase 2 which each extend over a third of the axial length of the stator component, and the still missing parts 40, 40' of the pole shoes of phase 2 which supplement pole shoe component 38. The individual parts 34, 38 and 40, 40' are joined together by packaging or adhesive bonding to form a stator section 32. The pole shoes 36 are subsequently wired with the winding for phase 2.

Figure 6:
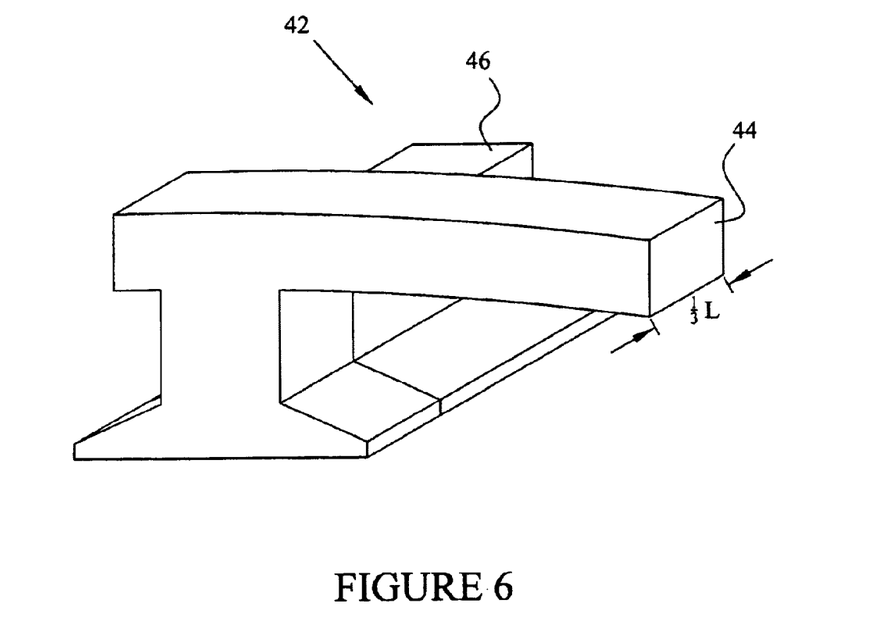
FIG. 6 shows a schematic perspective view of part of a third stator section of the stator component according to the invention.

FIG. 6 illustrates the stator section 42 for the third phase which is formed in mirror fashion to stator section 28 of the first phase. It consists of part 44 of the ring-shaped stator coil flux guide which extends over a third of the axial length of the stator component, and the pole shoes 46 assigned to phase 3. The stator section 42 illustrated in FIG. 6 can be manufactured from two parts (as is the case with the stator section 28 in FIG. 4).

Figure 7A:
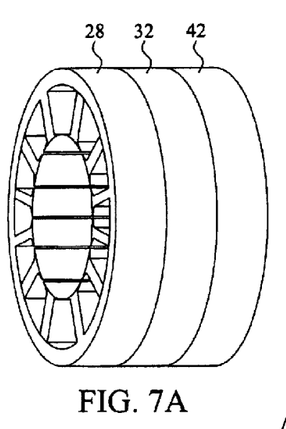
FIGS. 7a, 7b and 7c show a perspective view, a top view and a side view of the assembled stator component according to the invention, respectively.
Figure 7B:
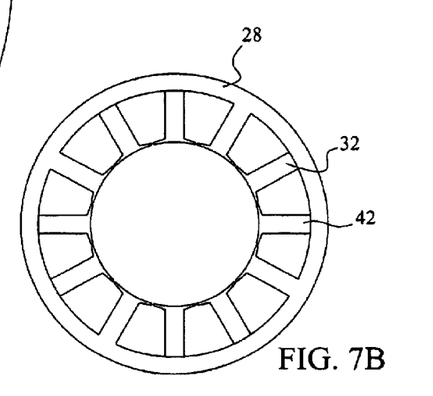
Figure 7C:
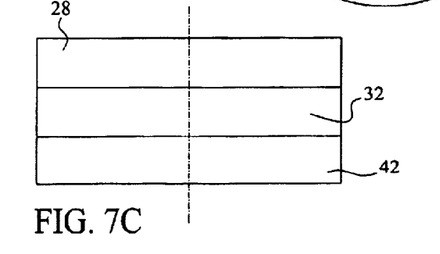

FIGS. 7a, 7b and 7c show a perspective view, a top view and a side view of the assembled stator component consisting of the three stator sections 28, 32, 42.

Figure 8A:
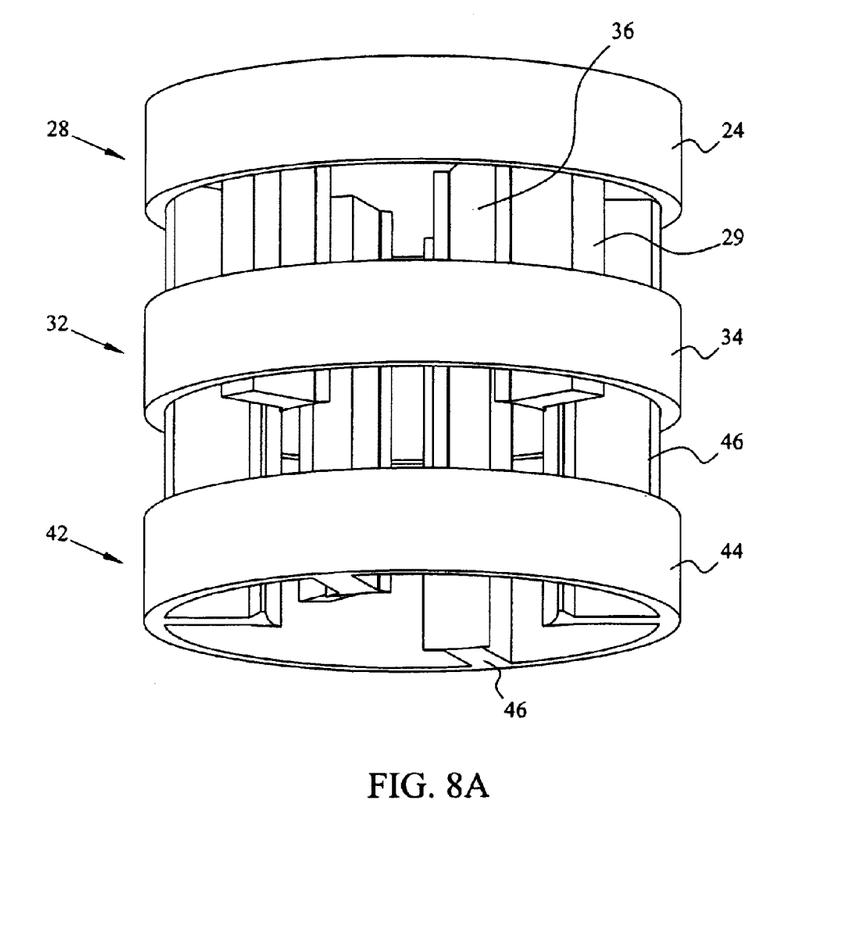
FIGS. 8a and 8b show a perspective view of the stator component according to the invention in a partially-assembled state, diagonally from both below and above, respectively.
Figure 8B:
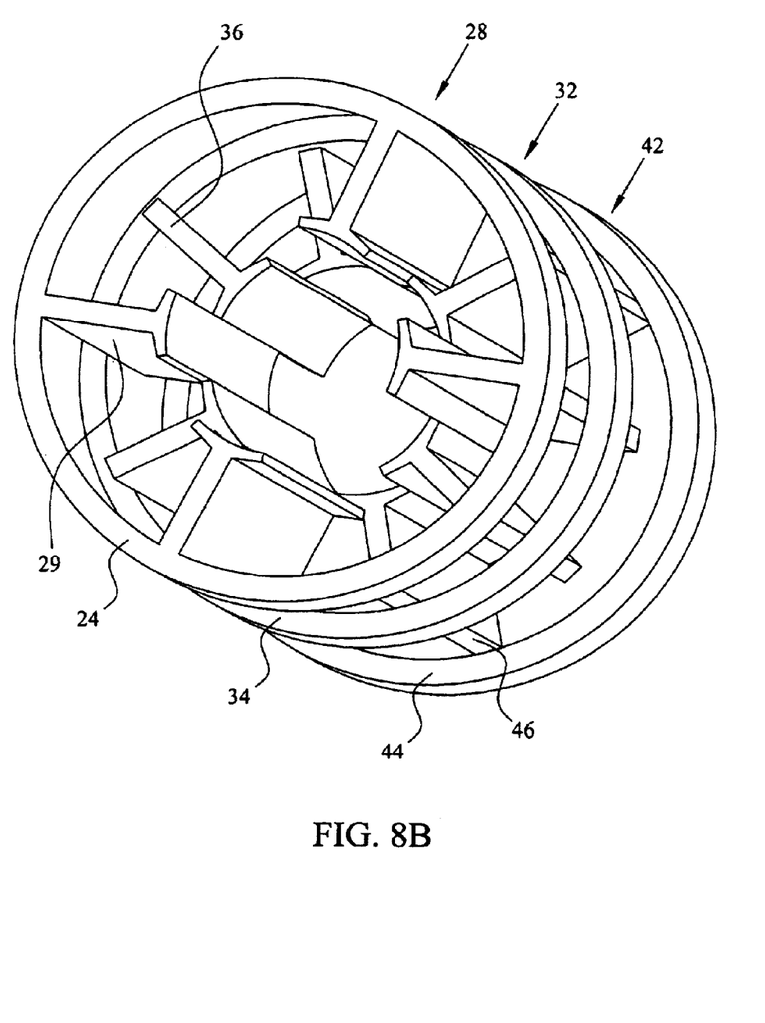

FIGS. 8a and 8b illustrate an exploded view of the stator component (in which the three stator sections 28, 32, 42 can be identified) prior to these being fully assembled to form the stator component. The parts 24, 34 and 44 of the ring-shaped stator coil flux guide belonging to the stator sections and the associated pole shoes 29, 36 and 46 can be identified in the figures.

The stator sections 28, 32, 42 are joined together in the axial direction after being wired (not illustrated in the figures), the stator sections 28 and 42 being pushed from above and below onto the stator section 32 so that part 34 of the ring-shaped stator coil flux guide comes to rest between the coil flux guide components 24 and 44 of the stator sections 28 and 42. The pole shoes 29, 36 and 46 are offset during this at 40° (360°:9) to each other.

The individual stator sections 28, 32 and 42 are preferably joined in this manner so that no magnetically effective gap is created between the adjacent surfaces of the coil flux guides and pole shoes of the other respective phases. This can be ensured with a good press fit or (if necessary) through use of a magnetically effective filler or adhesive (e.g. as described in JP 0 127 2102A).

A wired stator component is achieved after winding and assembling the individual stator sections 28, 32, 42 which optimally utilizes the winding space between the pole shoes and have a smaller slot opening than usual in the prior art.

The stator component according to the invention, on the one hand considerably simplifying winding of the pole shoes for the respective phases, and also creating a stator with an improved performance. The winding of a phase according to the invention can, in particular, be fitted completely to a stator section and connected to this before the individual stator sections are joined. The completely connected phase windings should only be subsequently connected in a delta or Y connection.

The stator component according to the invention is preferably used in an electronically-commutated brushless direct current (DC) motor.

The characteristics disclosed in the above description, figures and claims can be significant for the realization of the invention in its various embodiments, either individually or in any combination whatsoever.

IDENTIFICATION REFERENCE LIST

8 Stator component
10 Stator coil flux guide or yoke
12 Pole shoes
14 Stator slots
16 Slot opening
18, 18' Phase winding
20 Pole shoes
22 Hammer, tooth
24 Part of the ring-shaped stator coil flux guide
26 Part of the pole shoes
28 First stator section
29 Pole shoes
30 Part of the pole shoes
32 Second stator section
34 Part of the ring-shaped stator coil flux guide
36 Pole shoes
38 Part of the pole shoes
40, 40' Part of the pole shoes
42 Third stator section
44 Part of the ring-shaped stator coil flux guide or yoke
46 Pole shoes

What is claimed is:

1. A Stator assembly for use with a multi-phase inner rotor motor, comprising:
    a circular stator yoke having an inner periphery, a total axial length and a number of pole shoes extending radially inward from the inner periphery of the stator yoke;
    the stator yoke including a plurality of stator sections, each stator section encompassing all the pole shoes of one phase and each section axially extending to define a portion of the total axial length of the stator.

2. The Stator assembly according to claim 1, wherein each of the plurality of stator sections defines a part of the stator yoke.

3. The Stator assembly according to claim 1, wherein the pole shoes of each stator section extend along substantially an axial length of the stator yoke.

4. The Stator assembly according to claim 1, wherein the stator sections are interleaved with each other.

5. An electric motor comprising:
    a stator assembly for an inner rotor motor comprising a ring-shaped stator yoke and a number of pole shoes which protrude inwards from the stator yoke,
    wherein the stator component includes a plurality of stator sections, each stator section encompassing all the pole shoes of one phase and each stator section extending in an axial direction to define a portion of a total axial length of the stator yoke.

6. The Stator assembly according to claim 1, wherein the stator assembly is concentric with an axis of the rotor.

7. The Stator assembly according to claim 1, wherein an axial length for each stator section is substantially equal to the total axial length of the stator yoke divided by the number of phases of the motor.

8. The Stator assembly according to claim 1, wherein each stator section is adapted to receive the pole shoes corresponding to all phases of the multi-phase motor.

9. The Stator assembly according to claim 1, wherein the pole shoes are adherently bonded to the stator section.

10. The Stator assembly according to claim 1, wherein the each stator section is bonded to at least one other stator section.

11. The Stator assembly according to claim 1, wherein the pole shoes of each stator section are offset at an angle with respect to each other.

12. A Stator assembly for use with a multi-phase inner rotor motor, comprising:
 a circular stator yoke having an inner periphery and a number of pole shoes extending radially inward from the inner periphery of the stator yoke,
 the stator yoke including a plurality of stator sections, each stator section encompassing all the pole shoes of one phase;
 wherein an axial length for each stator section is substantially equal to the total axial length of the stator yoke divided by the number of phases of the motor.

13. A Stator assembly for use with a multi-phase inner rotor motor, comprising:
 a circular stator yoke having an inner periphery and a number of pole shoes extending radially inward from the inner periphery of the stator yoke,
 the stator yoke including a plurality of stator circular sections, with each said stator circular section encompassing all the pole shoes of one phase;
 wherein said each stator circular section is adapted to receive the pole shoes corresponding to all phases of the multi-phase motor and said stator circular sections are stacked in axial direction.

14. The electric motor of claim 5, wherein the plurality of stator section axially combine to form the total axial length of the stator.

15. The electric motor of claim 5, wherein each of the plurality of stator sections has substantially the same axial length.

16. The electric motor of claim 5, wherein each of the plurality of stator sections corresponds to a single phase of the motor.

* * * * *